US006757318B1

(12) United States Patent
Ziegler et al.

(10) Patent No.: US 6,757,318 B1
(45) Date of Patent: Jun. 29, 2004

(54) APPARATUS AND METHOD FOR SYNCHRONIZING WITH A COMMUNICATION NETWORK BY SHADOWING A PAGE RESPONSE CONNECTION TO THE NETWORK

(75) Inventors: Kevin Ziegler, Campbell, CA (US); Evgeni Stavinov, Sunnyvale, CA (US)

(73) Assignee: Computer Access Technology Corporation, Santa Clara, CA (US)

(*) Notice: Subject to any disclaimer, the term of this patent is extended or adjusted under 35 U.S.C. 154(b) by 735 days.

(21) Appl. No.: 09/688,373

(22) Filed: Oct. 10, 2000

(51) Int. Cl.[7] .................. H04B 1/713; H04B 17/00; H04L 7/00
(52) U.S. Cl. .................. 375/133; 375/134; 375/224; 375/356
(58) Field of Search .................. 375/132, 224, 375/225, 226, 227, 228, 356, 133, 134

(56) References Cited

U.S. PATENT DOCUMENTS 5,408,506 A * 4/1995 Mincher et al. ............ 375/134
6,275,500 B1 * 8/2001 Callaway et al. .......... 370/449

* cited by examiner

Primary Examiner—Stephen Chin
Assistant Examiner—David B. Lugo
(74) Attorney, Agent, or Firm—David R. Gildea

(57) ABSTRACT

A method and apparatus for synchronizing with a network without connecting to the network by shadowing a slave device while a master device connects the slave device to the network. The master device maintains a system clock time. The master and slave devices exchange communication traffic during time slots on channels in a channel hopping sequence derived from the system clock time. The method and apparatus obtain a slave clock time in an inquiry response packet from a slave device when the master and slave devices are not connected in the network and then use the slave clock time for shadowing the slave device for receiving a master page frequency hop synchronization (FHS) packet having the system clock time.

20 Claims, 6 Drawing Sheets

APPARATUS AND METHOD FOR SYNCHRONIZING WITH A COMMUNICATION NETWORK BY SHADOWING A PAGE RESPONSE CONNECTION TO THE NETWORK

BACKGROUND OF THE INVENTION

1. Field of the Invention

The invention relates generally to network synchronization and more particularly to a method and apparatus for synchronizing with a communication network, without joining the network, by acquiring a slave clock time from a slave device and then shadowing the slave device while the slave device responds to a page for connecting to the network.

2. Description of the Prior Art

Many system standards have been developed for communication. One such system standard is known as BLUETOOTH. BLUETOOTH is a short range radio system operating in the unlicensed 2.4 GHz Industrial Scientific Medical (ISM) band using frequency hopping spread spectrum signals. The spread spectrum signals enable the system to minimize fading and reduce interference between users. The BLUETOOTH spread spectrum is designed to meet parts 15 and 18 of the Federal Communications Commission (FCC) regulations in the United States and the regulations of other regulatory agencies in other countries. The BLUETOOTH signal uses seventy-nine or twenty-three frequency hopping channels depending upon the country of operation. At any one instant of time, the signal is transmitted in a single one of the channels. Each channel has a bandwidth of one megahertz. The channels succeed each other in a pseudo-random channel hopping sequence specified by a BLUETOOTH system standard. Each successive frequency channel corresponds to a phase or time slot of the pseudo-random sequence.

A BLUETOOTH system network known as a piconet includes a single master device and up to seven active slave devices. The network topology is referred to as a star because all communication involves the master device. Slave to slave communication is not allowed. Another BLUETOOTH network, known as a private network, uses only a single master device and a single active slave device. Typically, the private master and slave devices work with a limited subset of the BLUETOOTH protocol and are provided by a manufacturer as a set.

FIG. 1A shows a time line of communication traffic exchange in a BLUETOOTH network. Packets of information are exchanged between the master device and a selected slave device using time division duplex (TDD) with alternating master (master TX) and slave (slave TX) transmissions. Communication traffic is partitioned into time slots 625 microseconds in length for each frequency channel. Every other time slot is considered to be a master time slot. In the master time slot, the master device can transmit a master data packet addressed to a particular slave device. In the following time slot, the addressed slave device may respond to the master data packet by transmitting a slave data packet back to the master device. Transmissions in successive time slots occur on sequential frequency channels in a pseudo-random sequence shown in FIG. 1A in an exemplary manner as channels 79, 03, 06, 47, 18, 02, 17, and 61. The frequency channels are mapped to specific ISM band frequencies by adding a constant offset frequency that is specific to a region. In the United States and most of Europe the offset is 2402 megahertz.

FIG. 1B shows a simplified block diagram for a BLUETOOTH device having a hop sequence generator. Both the master and the slave devices compute the successive channels from a BLUETOOTH system clock time maintained in the master device and the address identification of the master device. In order to follow the frequency hopping sequence of a particular piconet, a slave device must know both the master address and the precise system clock time. The hop sequence generators in the master and slave devices compute the frequency channels for the communication traffic from 24 bits of a 48-bit IEEE address of the master device and a 28-bit system clock time. In addition the timing of the frequency hops is based upon the system clock time. The master clock is a free running counter that increments each 312.5 microseconds (3200 Hz) or one-half of a time slot. Packet data sent in a BLUETOOTH format is scrambled through a linear feedback shift register based on the BLUETOOTH clock to reduce DC bias and improve security of the information in the data packets.

Several modes are described in the BLUETOOTH system specification. The communication traffic mode is the normal operational mode for communication between the master and slave devices that are joined or connected in the network. Modes for inquiry, inquiry scan, and inquiry response are used in a who-is-there protocol for identifying BLUETOOTH devices that are within signal range. In the inquiry mode an inquiry is broadcast on frequency hopping channels of an inquiry sequence. A recipient BLUETOOTH device is induced by the inquiry to respond with an inquiry response having the address of the recipient device and the recipient device clock time on frequency hopping channels based upon the frequency channel of the inquiry. Inquiry scan is a mode for listening for an inquiry from a BLUETOOTH device on frequency hopping inquiry listen channels in an inquiry scan sequence.

Modes for page, page scan, page response, master page frequency hop synchronization (FHS), and slave page FHS response are used for synchronizing and connecting the devices. A page from a master device starts a paging handshake by transmitting an address identification of a device being paged on frequency hopping page transmit channels of a paging sequence. Page scan is a mode for listening on frequency hopping page listen channels of a page scan sequence for a page having the listener's address identification. Page response is a mode for responding to the page on page response channels based upon the page transmit channels. Master page FHS is a mode for responding to the page response by transmitting an FHS signal on the next frequency hopping channel in the paging sequence. Slave page FHS response is a mode for connecting to the network by responding to the master page FHS response.

FIG. 2A shows a time line of the operation of the master and slave devices during page and inquiry modes. In order to page a slave device, the master device alternately transmits (TX) pages on two successive frequency channels and then listens (LX) on two successive frequency channels for page responses. The page time period for each channel is 312.5 microseconds or one-half the normal time slot period of 625 microseconds. The slave device in page scan mode listens for the pages on successive page listen channels (LX scan k and LX scan k+1) of a page scan sequence with a time period of 1.28 seconds for each channel until a page is recognized.

FIG. 2B shows a time line of the paging sequence for the master device when the paged slave device responds to the page. The master device transmits (TX) pages in successive page transmit channels and listens (LX) for a page response in a paging sequence. When the page response is received, the master device responds by transmitting an FHS packet (TX FHS) containing both the address of the master device and the 26 most significant bits (MSB)s of the 28 bits of the system clock time on the next channel of the paging sequence. The slave device then resolves the 2 least significant bits (LSB)s of the master time clock from the time-of-arrival of the FHS packet. The slave device now has all the information it needs for determining the channels and timing of the frequency hopping sequence and participating in communication traffic. At this point, the slave device joins the network by responding to the FHS packet.

An inquiry is similar to a page in that an inquiring device transmits inquiries on successive frequency channels in an inquiry sequence and then listens on corresponding frequency channels for inquiry responses with time periods for each channel of 312.5 microseconds. A device in inquiry scan mode listens for the inquiries on successive channels of an inquiry scan sequence with a time period of 1.28 seconds for each channel until an inquiry is recognized. When the device in inquiry scan mode recognizes the inquiry it responds by transmitting an FHS packet having its address and 26 of the 28 bits of its own clock time. However, a major distinction between a page and an inquiry is that the time-of-transmission of the master page FHS packet for a page is based upon the system clock time whereas the time-of-transmission of the FHS packet for an inquiry is based upon the local clock time of the inquiring device. As a result of this distinction, existing BLUETOOTH devices use paging but not inquiry for determining the system clock time for synchronizing to the network. A second major distinction is that a page is always initiated by a master device whereas an inquiry may be initiated by any BLUETOOTH device having inquiry capability. A third major distinction is that the FHS packet for a page carries coarse system clock time whereas the FHS packet for an inquiry carries coarse clock time for whatever device responds to the inquiry.

A more complete description of the BLUETOOTH system is available in the specification volume 1, "Specification of the Bluetooth System—Core" v1.0 B published Dec. 1, 1999, and the specification volume 2, "Specification of the Bluetooth System—Profiles" v1.0 B published Dec. 1, 1999, both under document no. 1.C.47/1.0 B. The volume 1 core specification specifies the radio, baseband, link manager, service discovery protocol, transport layer, and interoperability with different communications protocols. The volume 2 profiles specification specifies the protocols and procedures required for different types of BLUETOOTH applications. Both volumes are available on-line at www.bluetooth.com or through the offices of Telefonaktiebolaget LM Ericsson of Sweden, International Business Machines Corporation, Intel Corporation of the United States of America, Nokia Corporation of Finland, and Toshiba of Japan.

In order to synchronize to BLUETOOTH communication traffic packets for measurement and analysis purposes it would be relatively straightforward for an analyzer to use the paging process to join the piconet as a test slave device. However, this approach has several disadvantages. First, by joining the piconet the analyzer changes the piconet. A question can then arise as to whether the communication traffic pattern on the piconet was affected by the presence of the analyzer. Second, the analyzer would necessarily use one of the active slave positions in the piconet. Where all of the up seven slave positions were being used, the connection of the analyzer would prevent one of the slaves from being connected. This might be inconvenient and it would certainly change the network being tested. Worse still, in a private network having only a single master and single operational slave, the analyzer would replace either the master or the single active slave, thereby making it impossible to observe actual communication traffic between the master and the slave device.

In general, it is desirable that a protocol analyzer monitor message traffic for measurement and analysis on a link without joining or interfering with the operation of the link. With regard to a BLUETOOTH network, this means that a protocol analyzer should be able to follow all the traffic in a piconet without replacing the master or any of the operational slaves, or participating in the piconet in any way as either a master of a slave device. However, in order to monitor traffic on a BLUETOOTH link, a protocol analyzer needs to know the system clock time for the piconet. Unfortunately, the BLUETOOTH system protocol specification does not make any provision for acquiring this clock time except by joining and participating in the piconet. Therefore, there is a need for system that goes beyond the BLUETOOTH specification for non-intrusive test and measurement of a BLUETOOTH link.

SUMMARY OF THE INVENTION

It is therefore an object of the present invention to provide an apparatus and method for synchronizing with communication traffic on a network having master and slave devices, without joining the network, by first acquiring a slave clock time from a slave device and then using the slave clock time for shadowing the slave device while the slave device responds to a page for acquiring a system clock time and connecting to the network. This and other objects of the present invention will no doubt become obvious to those of ordinary skill in the art after having read the following summary and detailed description and viewing the figures illustrating the preferred embodiments.

Briefly, in a preferred embodiment, the present invention is a method and apparatus for synchronizing with communication traffic during time slots on channels in a channel hopping sequence on a network connecting a master device and slave devices. The timing and sequence of the channels of the communication traffic are synchronized to a system clock time that is maintained by the master device and used by the slave device. The method and apparatus of the present invention is embodied in an analyzer that obtains a slave clock time in an inquiry response packet from a slave device when the master and slave devices are not connected in the network and then uses the slave clock time for shadowing the slave device for receiving a master page frequency hop synchronization (FHS) packet having the system clock time.

The analyzer in a preferred embodiment transmits an inquiry and receives an inquiry response from the master and slave devices that are within signal range and are capable of connecting in the network but are not currently connected. The inquiry response from a slave device includes a slave clock time for that slave device. The analyzer uses the slave clock time for shadowing the slave device while the slave device scans for a page from the master device, receives a page response from the slave device to the master device in response to the page, and receives a master page FHS packet having the system clock time from the master device to the slave device. The slave connects to the master device by responding to the master page FHS packet. At this point the slave device and the master device are in a condition where communication traffic can be exchanged on channels derived from the system clock time in the channel hopping sequence. The analyzer uses the system clock time obtained with the FHS packet for synchronizing with the channel hopping sequence for observing the communication traffic.

Two enhancements improve the robustness of a preferred embodiment of the method and analyzer. First, the analyzer calculates a slave clock rate by comparing the slave clock times in two inquiry responses to their times of reception in the analyzer and then uses the calculated slave clock rate for tracking the slave clock time within the analyzer. Second, the analyzer scans for the page to the slave device at least one channel earlier in a page scan sequence than is expected based upon the slave clock time. When the apparatus recognizes the page on the early channel, it listens on one channel early, prompt, and one channel late page response channels for a page response.

Although the preferred embodiments illustrated in the figures and described in the accompanying detailed descriptions are described in terms of a BLUETOOTH system network, the present invention is applicable to other system networks using distinguishable channels in channel hopping sequences. The distinguishable channels may be implemented with frequencies, codes, time allocations, polarities, or any other distinguishing features alone or in combination.

DETAILED DESCRIPTION OF THE PREFERRED EMBODIMENTS

Figures 1A, 1B:
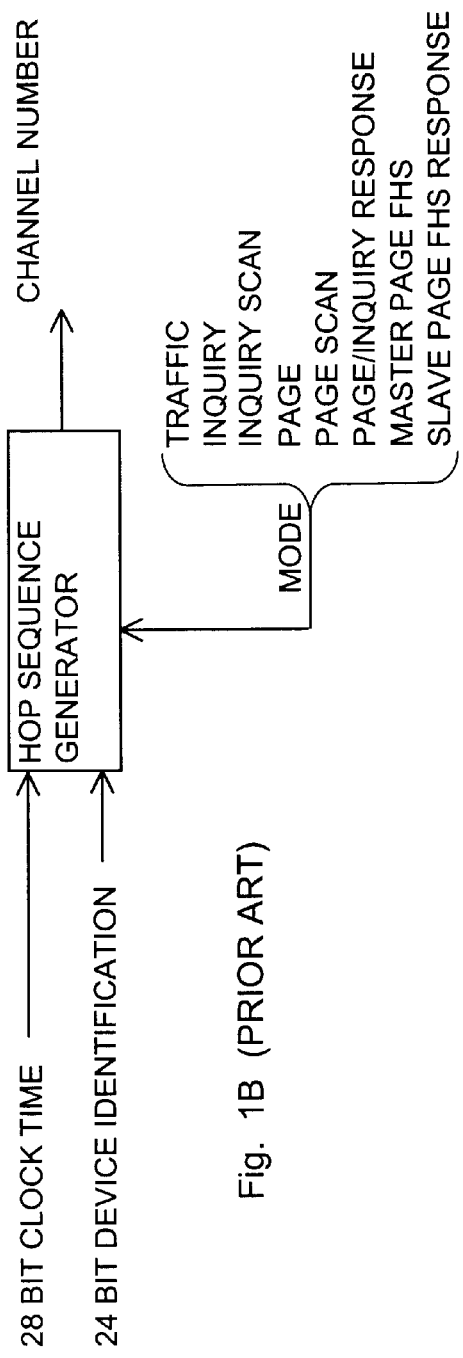
FIGS. 1A and 1B are a time line for communication traffic in a BLUETOOTH network of the prior art and a simplified block diagram of a BLUETOOTH device of the prior art, respectively.
Figure 2A:
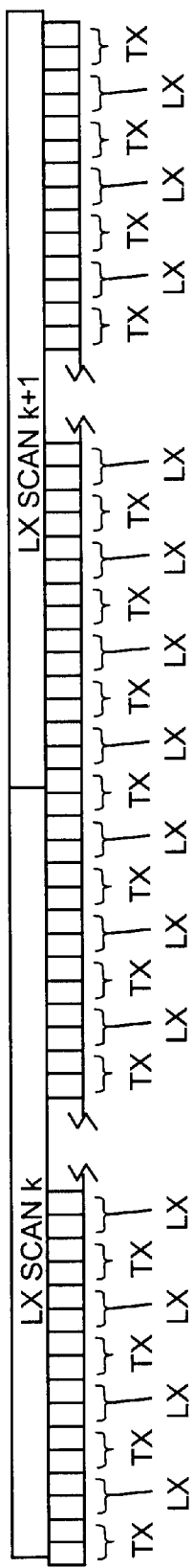
FIG. 2A is a time chart of page and page scan or inquiry and inquiry scan modes in a BLUETOOTH network of the prior art.
Figure 2B:
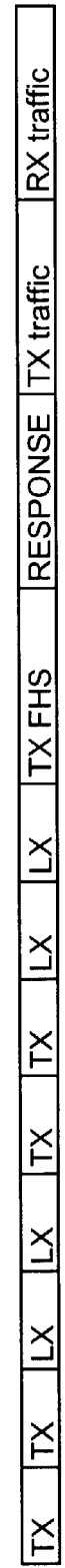
FIG. 2B is a time chart of page and page response communications in a BLUETOOTH master device of the prior art.
Figure 3:
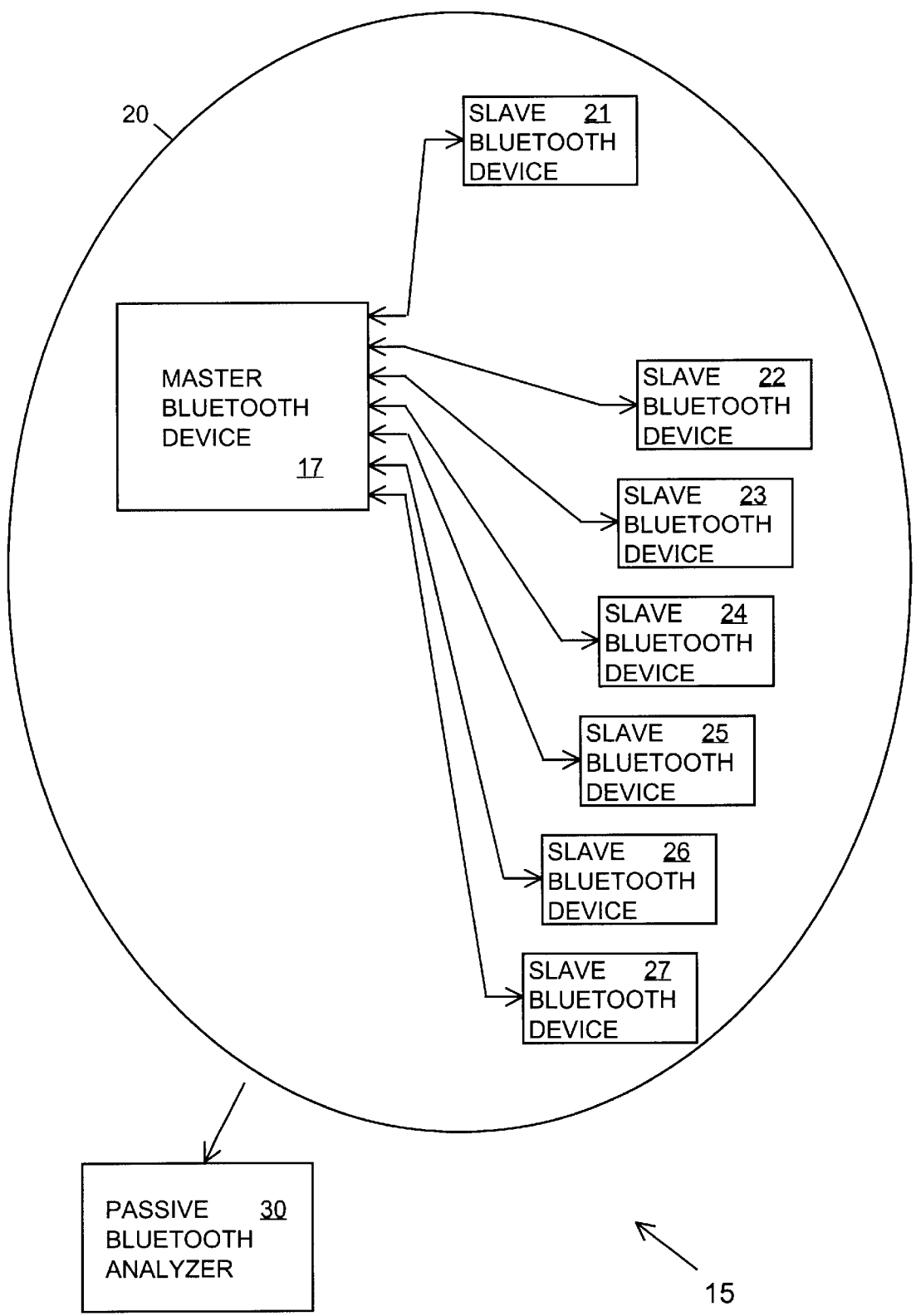
FIG. 3 is a block diagram of a system including a passive analyzer of the present invention.

FIG. 3 is a diagram of a system of the present invention referred to by the general reference number 15. The system 15 includes a BLUETOOTH master device 17 connected in a piconet network 20 to up to seven BLUETOOTH slave devices 21–27. The master device 17 and the slave devices 21–27 communicate during time slots on frequency channels in a channel hopping sequence as described above. An analyzer 30 of the present invention observes communication traffic signals between the master device 17 and the slave devices 21–27 in the network 20 but does not transmit communication traffic signals and the master device 17 and the slaves devices 21–27 are not aware that the analyzer 30 receives the communication traffic signals.

Figure 4:
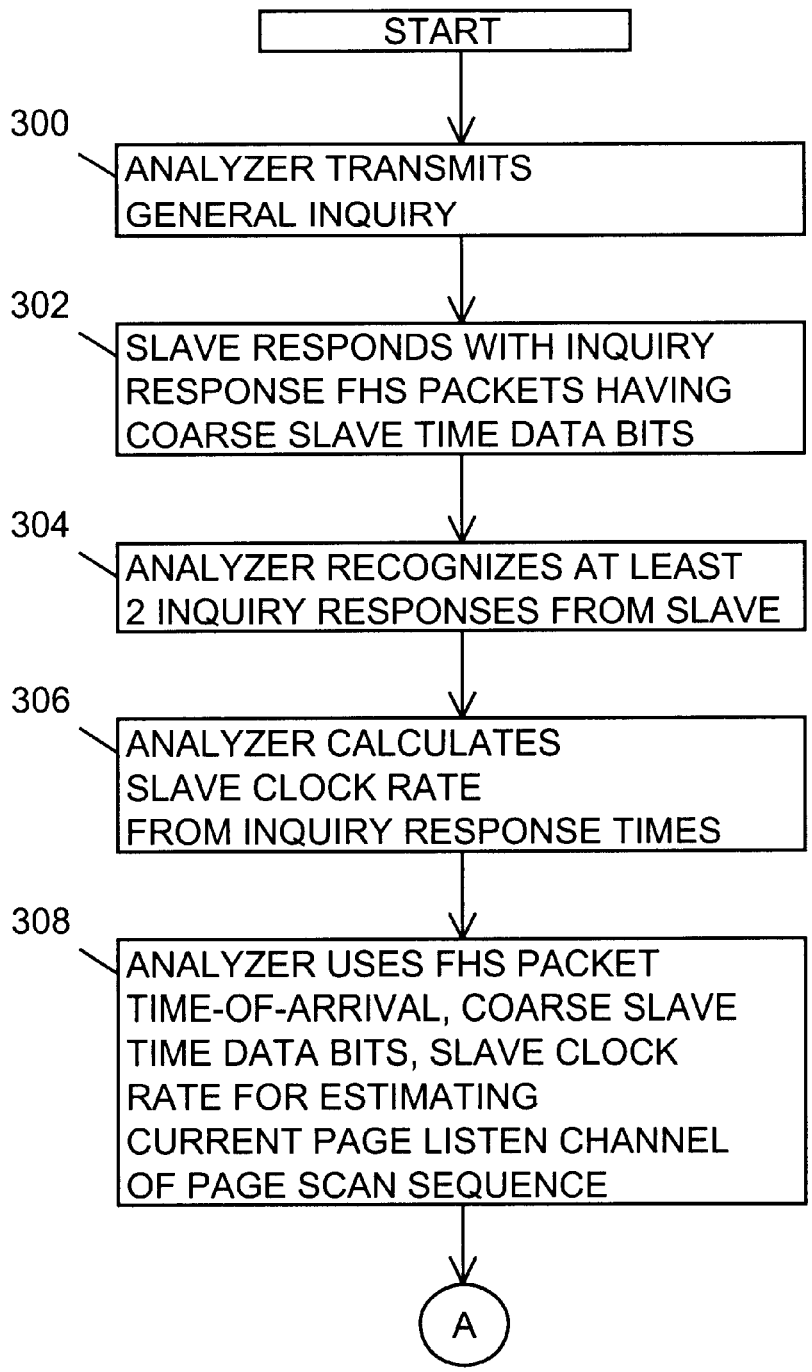
FIGS. 4 and 5 are parts one and two, respectively, of a flow chart of a method of the present invention in the analyzer of FIG. 3 for synchronizing to a network having communication traffic on channels during time slots in a channel hopping sequence without joining the network.
Figure 5:
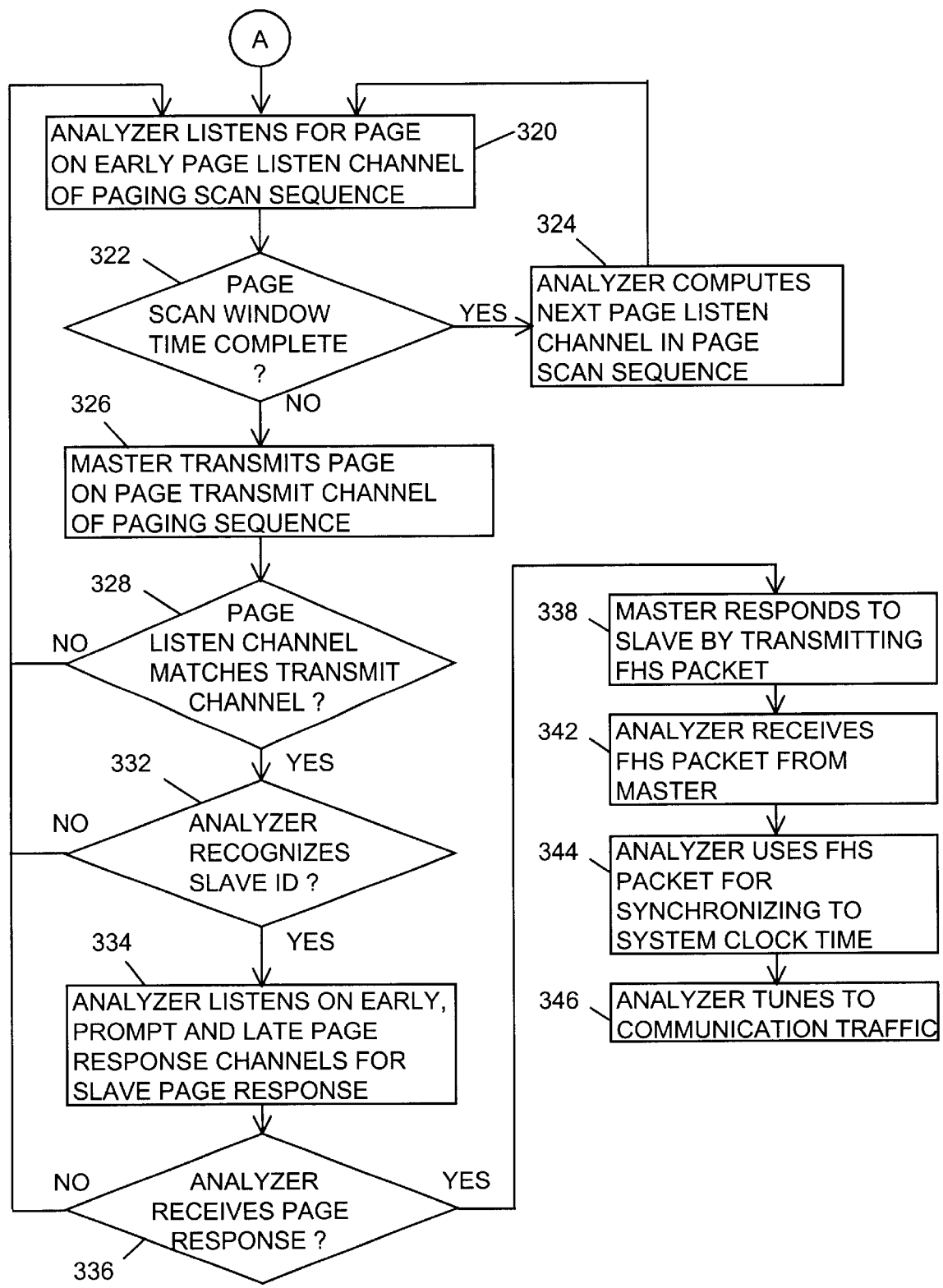

FIGS. 4 and 5 are parts one and two, respectively, of a flow chart of a method for synchronizing to communication traffic on the network 20. In this method the analyzer 30 uses an inquiry response frequency hop synchronization (FHS) packet from one of the slave devices 21–27, for finding the clock time for that one of the slave devices 21–27, uses the slave clock time for shadowing the slave page scan sequence for observing a page to that one of the slave devices 21–27, and uses a master page FHS packet transmitted by the master device 17 for determining the system clock time.

Referring to FIG. 4, at the start, a user enters the address identification of one of the slave devices 21–27, for example the slave device 21. Then in a step 300 the analyzer 30 transmits a general inquiry. In an event 302 all BLUETOOTH devices including the slave device 21 within signal range of the analyzer 30 capable of responding to an inquiry will reply with several inquiry response FHS packets over a time period. The FHS packets include the respective BLUETOOTH device addresses and the 26 MSBs (coarse time data bits) of the respective 28 bit clock times at the starts of the packets. The analyzer 30 parses these inquiry response FHS packets looking for an address match with the slave device 21. In a step 304 the analyzer 30 recognizes at least two inquiry response FHS packets from the slave device 21 over the inquiry response time period. Note that these FHS packets are not the same as the FHS packet from the master device 17. These FHS packets have the clock time of the slave device 21, not the BLUETOOTH system clock time of the master device 17.

In a step 306 the analyzer 30 compares the difference between a first slave clock time in a first FHS packet and a second slave clock time in a second FHS packet from the slave device 21 to the difference in a first local clock time for the reception of the first FHS packet and a second local clock time for the second FHS packet. The analyzer 30 uses the comparison for calculating the slave clock rate for the slave device 21 with respect to the local clock rate in the analyzer 30. The analyzer 30 uses the last slave clock time that is received for setting the local clock time and uses the calculated slave clock rate for adjusting the local clock rate for estimating and tracking the slave clock time within the analyzer 30. In a step 308 the analyzer 30 uses the coarse slave time data bits and the time-of-arrival of the last FHS packet together with the tracking clock time for deriving an estimated current page listen channel for the slave device 21 in the page scan sequence.

Referring to FIG. 5, in a step 320 the analyzer 30 begins listening for a page from the master device 17 intended for the slave device 21 on the page listen channel one channel earlier in the page scan sequence than the page listen channel that is derived from the slave clock time. In a step 322 the analyzer 30 determines whether the page scan time, 1.28 seconds in a BLUETOOTH embodiment, is complete. In a step 324 when the scan time completes, the analyzer 30 computes the next page listen channel in the page scan sequence and then in the step 320 listens for the page on that channel and so on always one channel earlier in the page scan sequence than is computed from the estimated slave clock time.

In a step 326 the master device 17 is instructed to begin transmitting pages on page transmit channels of a paging sequence. In a step 328 the analyzer 30 determines when the early page listen channel and the page transmit channel match. In a step 332 when the early page listen channel and the page transmit channel match, the analyzer 30 determines when the address identification in the page matches the slave device 21. When no match is found between the early page listen channel and the page transmit channel or the address identification does not match the slave device 21, the analyzer 30 continues listening for the page in the step 320 and testing in the step 322 as to whether the page scan time is complete.

When the slave device 21 recognizes a page on a page transmit channel, it is expected to respond exactly one time slot (625 microseconds) later with a page response on a page response channel that is based upon, but in general not the same as, the page listen channel on which the page was recognized. Because the page listen channel on which the page is recognized is the same as the page transmit channel on which the page was transmitted, it could also be said that the page response channel is based upon the page transmit channel. In the master device 17, the page transmit channels in the paging sequence are interspersed with master page listen channels for listening for a page response. However, it should be noted for the discussion below that the page transmit channels follow the same sequence at a different, higher rate as the slave page listen channels. In a step 334 when the address identification of the slave device 21 is detected by the analyzer 30 in a page on the early page listen channel, the analyzer 30 listens for the slave page responses on the early, prompt and late page response channels corresponding to early, prompt, and late page listen (transmit) channels, respectively, until a slave page response is recognized.

For example, when the analyzer 30 detects a page on an early page listen channel "k–1", the analyzer 30 listens exactly one time slot later for the slave early page response on the early page response channel "m–1" corresponding to the early page listen channel "k–1" in the page scan sequence. If the early page response from the slave device 21 is not detected, the analyzer 30 listens for the slave prompt page response on the prompt page response channel "m" corresponding to the prompt page listen channel "k" of the page scan sequence. If the prompt page response is not detected, the analyzer 30 listens for the slave late page response on the late page response channel "m+1" corresponding to the late page listen channel "k+1" of the page scan sequence. Note that the times-of-arrival of the prompt and late pages form the master device 17 are known according to the BLUETOOTH system specification from the time-of-arrival of the early page the analyzer 30, and the slave device 21 transmits a page response exactly one time slot after the page to which it is responding. Therefore, the analyzer 30 does not need to actually observe the prompt and late pages in order to know when to listen for the prompt and late slave page responses.

The slave device 21 may only enter the page scan mode periodically, however, the analyzer 30 operates continuously in the page scan mode to ensure that when the slave device 21 detects the page from the master device 17, the page is also detected by the analyzer 30. In a step 336 the analyzer 30 determines when it has received the page response from the slave device 21. When the analyzer 30 does not receive a slave page response, it assumes that the slave device 21 is not currently in page scan mode. In that case the analyzer 30 continues listening for the page in the step 320 and testing in the step 322 as to whether the page scan time is complete.

When the slave response is received, analyzer 30 listens for an event 338 for the master device 17 to transmit a master page FHS packet on the next channel in the paging sequence. In a step 342 the analyzer 30 listens for the master page FHS packet on channels of the paging sequence every 1.25 milliseconds for up to 32 channels until the master page FHS packet is received. Otherwise, the analyzer 30 times out and returns to the step 320 for listening for the page and the step 322 for determining whether the page scan time is complete. In a step 344 the analyzer 30 uses the coarse time data bits and the time-of-arrival of the master page FHS packet for determining the system clock time in a conventional manner. Then, in a step 346 the analyzer 30 uses the system clock time for hopping channels with the network 20 and tuning and observing communication traffic between the master device 17 and the slave devices 21–27.

Figure 6:
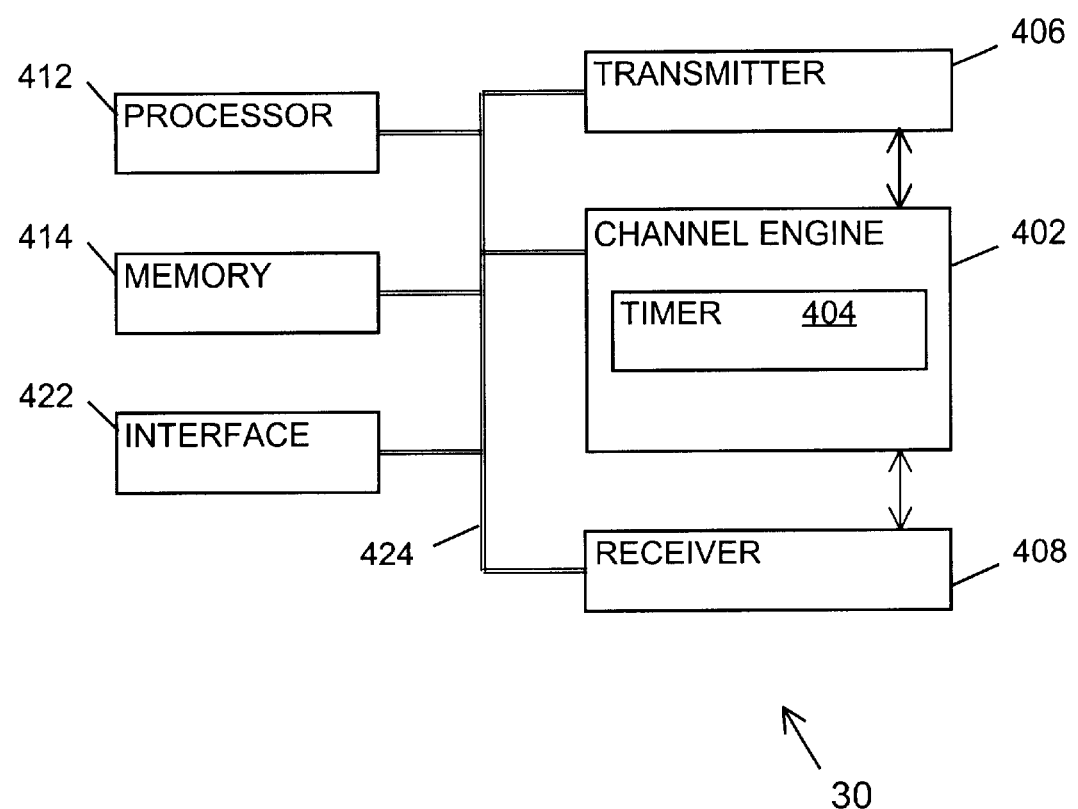
FIG. 6 is a block diagram of the analyzer of FIG. 3 for implementing the method of FIGS. 4 and 5.

FIG. 6 is a block diagram of the analyzer of the present invention referred to by the reference number 30. The analyzer 30 includes a channel engine 402 including a hop sequence generator and a timer 404; a transmitter 406; and a receiver 408. The timer 404 includes an oscillator, preferably using a crystal as a resonant element, as a time base for providing a local clock time. In an unsynchronized condition the local clock time has a clock rate that is nominally the same as the clock rate of the system clock time. The channel engine 402 provides information to the timer 404 for setting the local clock time according to the coarse master and slave clock time data bits; times-of-arrival of various signal packets, and the slave clock rate. Then, once the system clock time has been acquired from the master device 17, the timer 404 continues to use information for the times-of-arrival of the communication traffic packets for providing a local clock time that tracks the system clock time. The channel engine 402 then uses the local clock times provided by the timer 404 together with information for operational modes and address identifications for determining the timing and channels for the channel hopping sequences as described above. The transmitter 406 transmits inquiry signals according to the channels and times from the channel engine 402. The receiver 408 uses the channels and times from the channel engine 402 for receiving communication traffic, pages, page responses, inquiry responses, master page FHS responses.

The analyzer 30 also includes a processor 412, memory 414, an interface 422, and a signal bus 424. The processor 412 operates in a conventional manner over the signal bus 424 for using program codes in the memory 414 for coordinating the activities of the above described elements of the analyzer 30. The interface 422 connects the analyzer 30 to external equipment for automatic operation of the analyzer 30 and passing data for the packets, measurements, and analysis from the analyzer 30 to the external equipment. A user entry device in the external equipment enables a human user to set the mode in the analyzer 30 and to setup measurements and analysis on the communication traffic packets. A display on the external equipment enables a human user to view the status of the analyzer 30 and observe the communication traffic packets and results of the measurements and analysis. In a preferred embodiment, the channel engine 402 is implemented in a hardware state machine. However, those of ordinary skill in the fields of hardware and software development engineering will recognize that the channel engine 402 can be implemented in many ways including a software state machine or multitasking software.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of synchronizing to communication traffic signals between a master device and a slave device on channels during time slots in a channel hopping sequence, comprising steps of:

receiving at least one inquiry response signal having a slave clock time for said slave device;

shadowing said slave device according to said slave clock time for receiving a synchronization signal having a system clock time transmitted by said master device to said slave device; and synchronizing to said channel hopping sequence according to said system clock time for observing said communication traffic signals.

2. The method of claim 1, further comprising a step of:

transmitting an inquiry signal for eliciting said at least one inquiry response signal.

3. The method of claim 1, wherein:

the step of receiving said at least one inquiry response signal includes steps of: receiving a first said inquiry response signal having a first said slave clock time at a first local time; and receiving a second said inquiry response signal having a second said slave clock time at a second local time; and the step of shadowing said slave device includes steps of: calculating a slave clock rate from said first and second slave clock times and said first and second local clock times; and using said calculated slave clock rate for tracking said slave clock time.

4. The method of claim 1, wherein:

the step of shadowing includes a step of:

deriving page listen channels of a page scan sequence from said slave clock time; and sequentially tuning to said page listen channels until a page signal is recognized from said master device.

5. The method of claim 4, wherein:

the step of deriving said page listen channels includes deriving early said page listen channels at least one channel earlier in said page scan sequence than indicated by said slave clock time.

6. The method of claim 5, wherein:

the step of shadowing further includes steps of:

listening for a page response signal on at least one page response channel based upon said early page listen channel where said page signal is recognized;

recognizing a page response signal from said slave device on said page response channel;

deriving a master page synchronization channel from said page response channel where said page response signal is recognized; and receiving said synchronization signal on said master page synchronization channel.

7. The method of claim 6, wherein:

the step of listening for said page response signal includes sequentially listening for said page response signal on an early said page response channel corresponding to said early page listen channel where said page signal is recognized, listening for said page response signal on a prompt said page response channel corresponding to a prompt said page listen channel one channel later in said page scan sequence than said early page listen channel where said page signal is recognized, and listening for said page response signal on a late said page response channel corresponding to a late said page listen channel two channels later in said page scan sequence than said early page listen channel where said page signal is recognized until said page response signal is received.

8. The method of claim 1, wherein:

said master device operates according to a BLUETOOTH specification; and said slave device operates according to said BLUETOOTH specification.

9. An apparatus for synchronizing to communication traffic signals between a master device and a slave device on channels during time slots in a channel hopping sequence, comprising:

a channel engine for shadowing said slave device according to at least one slave clock time for receiving a system clock time carried by a synchronization signal transmitted from said master device to said slave device and then deriving said channel hopping sequence from said system clock time; and a receiver for receiving at least one inquiry response signal having said at least one slave clock time from said slave device, using said slave clock time for receiving said synchronization signal and then using said system clock time for synchronizing to said channel hopping sequence for observing said communication traffic signals.

10. The apparatus of claim 9, further comprising:

a transmitter for transmitting an inquiry signal for eliciting said at least one inquiry response signal.

11. The apparatus of claim 9, wherein:

the receiver receives a first said inquiry response signal having a first said slave clock time at a first local time and receives a second said inquiry response signal having a second said slave clock time at a second local time; and the channel engine calculates a slave clock rate from said first and second slave clock times and said first and second local clock times, and includes a timer for using said calculated slave clock rate for shadowing said slave device.

12. The apparatus of claim 9, wherein:

the channel engine derives page listen channels of a page scan sequence from said slave clock time; and the receiver sequentially tunes to said page listen channels until a page signal is recognized.

13. The apparatus of claim 12, wherein:

the channel engine derives early said page listen channels at least one channel earlier in said page scan sequence than indicated by said slave clock time.

14. The apparatus of claim 13, wherein:

the channel engine derives at least one page response channel based upon said early page listen channel where said page signal is recognized, and then uses said page response channel where a page response signal is recognized for deriving a master synchronization channel; and the receiver receives said page response signal from said slave device on said page response channel where said page response signal is recognized, and then receives said synchronization signal on said master synchronization channel in response to said page response signal.

15. The apparatus of claim 14, wherein:

the receiver sequentially tunes, until said page response signal is received, to an early said page response channel corresponding to said early page listen channel where said page signal is recognized, a prompt said page response channel corresponding to a prompt said page listen channel one channel later in said page scan sequence than said early page listen channel where said page signal is recognized, and a late said page response channel corresponding to a late said page listen channel two channels later in said page scan sequence than said early page listen channel where said page signal is recognized.

16. The apparatus of claim 9, wherein:

said master device operates according to a BLUETOOTH specification; and said slave device operates according to said BLUETOOTH specification.

17. The method of claim 1, wherein:

said slave clock time is not derived from said system clock time.

18. The method of claim 1, wherein:

shadowing said slave device includes shadowing said slave device when said slave device is not connected to said master device; and said synchronization signal enables said slave device to connect to said master device for transmitting and receiving said communication traffic signals.

19. The apparatus of claim 9, wherein:

said slave clock time is not derived from said system clock time.

20. The apparatus of claim 9, wherein:

the channel engine shadows said slave device according to said slave clock time while said slave device is not connected to said master device; and said synchronization signal enables said slave device to connect to said master device for transmitting and receiving said communication traffic signals.

* * * * *